Oct. 12, 1965 G. E. OLSON 3,212,063

PARITY RESPONSIVE DETECTOR

Filed June 5, 1961 5 Sheets-Sheet 1

INVENTOR
GEORGE E. OLSON

BY Gunter A. Hauptman
ATTORNEY

Oct. 12, 1965 G. E. OLSON 3,212,063

PARITY RESPONSIVE DETECTOR

Filed June 5, 1961

5 Sheets-Sheet 2

Oct. 12, 1965 G. E. OLSON 3,212,063

PARITY RESPONSIVE DETECTOR

Filed June 5, 1961 5 Sheets-Sheet 4

3,212,063

PARITY RESPONSIVE DETECTOR

George E. Olson, Wappingers Falls, N.Y., assignor to International Business Machines Corporation, New York, N.Y., a corporation of New York Filed June 5, 1961, Ser. No. 115,032
8 Claims. (Cl. 340—172.5)

This invention relates to electronic apparatus. More specifically, this invention relates to apparatus for increasing the information carrying ability of an information transmission system.

In electronic data processing systems, it is often necessary to transfer information between units located at great distances from each other, utilizing telephone transmission lines to connect the units together. For example, a computer may be connected to a magnetic tape unit if seven telephone channels are provided for data transmission and if an additional channel is provided for controlling the magnetic tape unit. Since each one of these eight lines results in a separate line charge to the user, the elimination of one or more channels substantially reduces the transmission link cost.

This invention utilizes the parity bit, usually associated with information transfers in data processing systems, to represent information, in addition to its normal function. A parity bit is normally transmitted along with binary or binary coded decimal (BCD) information in order to keep the total bit count either odd or even. If a single transmission error occurs, it will cause the total bit count to change from the reference, (ODD or EVEN), indicating an error condition. For example, computers are commonly connected to magnetic tape units by seven "data" lines and a number of control lines. Six of the data lines are used for the transmission of BCD data and the seventh data line is used to carry the parity bit. The standard practice is to assign odd parity to BCD data information so that all data will contain at least one "1" bit. There will be described apparatus embodying the invention described in this application permitting one parity, for example odd parity, to be assigned for the transmission of data and the other parity, even parity, to be assigned for the transmission of control signals. Thus the additional lines usually reserved for the transmission of control signals are not needed, effecting a great saving in the cost and maintenance of the communication link between a computer and a magnetic tape unit, without losing the effect of the parity bit.

For the purpose of illustration, a computer to remote magnetic tape unit link, standardly employing eight transmission lines (six BCD lines, one ODD parity line, and one control line) will be discussed. It is obvious that the invention is applicable to any communication system utilizing a parity bit for error detection, and that the scope of invention extends to many devices in addition to the one given as an example. In the normal operation of a computer-to-tape unit or tape-unit-to-computer link the full information carrying ability of the seven channel data transmission portion of the eight channel link is not utilized. The arbitrary assignment of odd parity prohibits the utilization of 50% of the information carrying ability of seven lines. The occurrence of an even number of bits, half of the total number of bit permutations, always indicates an error. This invention permits the control signals usually carried by the eighth line to be carried instead by the six data lines, the seventh parity line carrying a signal to maintain (in the case of control signals) an even parity. As a result, an odd parity will indicate a data character and an even parity will indicate a control character.

It is therefore an object of this invention to provide apparatus for decreasing the cost of connecting remotely located parts of an electronic data processing system.

It is another object of this invention to provide apparatus which permits a reduction in the number of channels required to connect parts of an electronic data processing system.

Still another object of this invention is to provide apparatus permitting an increase in the information carrying capacity of channels connecting parts of an electronic data processing system.

A further object of this invention is to provide apparatus permitting a decrease in the number of telephone channels necessary to connect a computer with a magnetic tape unit.

A still further object of this invention is to utilize both odd and even parity for transmitting information without negating the error detecting function of parity utilizing codes.

It is another object of the invention to provide apparatus responsive to errors in information having both odd and even parity.

An additional object of this invention is to provide apparatus responsive to first signal groups having a fixed parity, to second signal groups having an opposite parity, and to errors occurring in said signals.

These and other objects are achieved in a first embodiment of this invention by providing means for recognizing whether incoming information has odd or even parity. If the parity of a first BCD character is odd it is assumed, as an illustration only, that the information is numerical or alphabetic data. If the parity of the first BCD character is even it is assumed, again as an illustration only, that control information or special characters are being received. If a second character has the same parity, the first character is assumed to be correct and will be routed to its proper destination. If the second character has the opposite parity, the validity of the second character is in doubt. The second character is held until a third character is examined. If the third character has the same parity as the second character, a valid transition from one type of information having one parity to another type of information having the opposite parity has probably been made, and the second character is routed to its destination. However, if the third character has a parity unlike the second character (but the same as the first character) then the second character was wrong, causing an error signal to be emitted.

In a second embodiment of this invention means are also provided for recognizing the parity of incoming information wherein one parity is assigned to a first type of information and the opposite parity is assigned to another type of information. In addition there is provided a decoder operating only when the information has a fixed one of the two parties, for indicating whether the information is in fact the type assigned the fixed parity. An error signal occurs if the decoder identifies the information as not belonging to the group indicated by its parity.

A third embodiment of this invention provides means for recognizing the parity of incoming information wherein one parity is assigned to a first type of information and the opposite parity is assigned to more than one other type of information. A decoder may be provided for each type of information to indicate whether the incoming signals do, or do not, belong to that group. If the indicated parity does not match the group recognized by the decoders, an error is signaled.

The foregoing and other objects, features and advantages of the invention will be apparent from the following more particular description of preferred embodiments of the invention, as illustrated in the accompanying drawings.

In the figures:

FIGURE 1 is a block diagram showing a system utilizing the invention.

FIGURE 2*a* is a logic diagram of a first embodiment of the invention.

FIGURE 2*b* is a diagram of waveforms found at indicated points in the embodiment of the invention shown in FIGURE 2*a*.

This invention is applicable to any data transmission system using a parity-type error detecting system. For purposes of explanation only, a BCD parallel by bit, serial by character transmission scheme utilizing an odd parity will be described. It is obvious that the invention is equally applicable to serial by bit schemes. The following table gives the bit configurations for data and control instructions (including special characters).

TABLE

*Data characters (odd parity)*

| Char. | C | BA | 8421 | Char. | C | BA | 8421 |
|---|---|---|---|---|---|---|---|
| A | 0 | 11 | 0001 | S | 1 | 01 | 0010 |
| B | 0 | 11 | 0010 | T | 0 | 01 | 0011 |
| C | 1 | 11 | 0011 | U | 1 | 01 | 0100 |
| D | 0 | 11 | 0100 | V | 0 | 01 | 0101 |
| E | 1 | 11 | 0101 | W | 0 | 01 | 0110 |
| F | 1 | 11 | 0110 | X | 1 | 01 | 0111 |
| G | 0 | 11 | 0111 | Y | 1 | 01 | 1000 |
| H | 0 | 11 | 1000 | Z | 0 | 01 | 1001 |
| I | 1 | 11 | 1001 | 1 | 0 | 00 | 0001 |
| J | 1 | 10 | 0001 | 2 | 0 | 00 | 0010 |
| K | 1 | 10 | 0010 | 3 | 1 | 00 | 0011 |
| L | 0 | 10 | 0011 | 4 | 0 | 00 | 0100 |
| M | 1 | 10 | 0100 | 5 | 1 | 00 | 0101 |
| N | 0 | 10 | 0101 | 6 | 1 | 00 | 0110 |
| O | 0 | 10 | 0110 | 7 | 0 | 00 | 0111 |
| P | 1 | 10 | 0111 | 8 | 0 | 00 | 1000 |
| Q | 1 | 10 | 1000 | 9 | 1 | 00 | 1001 |
| R | 0 | 10 | 1001 | 0 | 1 | 00 | 1010 |

*Special and instruction characters (even parity)*

| Character | C | BA | 8421 |
|---|---|---|---|
| , | 1 | 11 | 1011 |
| □ | 0 | 11 | 1100 |
| $ | 0 | 10 | 1011 |
| * | 1 | 10 | 1100 |
| , | 0 | 01 | 1011 |
| % | 1 | 01 | 1100 |
| # | 1 | 00 | 1011 |
| @ | 0 | 00 | 1100 |
| & | 0 | 11 | 0000 |
| – | 1 | 10 | 0000 |
| Blank | 1 | 01 | 0000 |
| / | 0 | 01 | 0001 |
| Plus Zero | 0 | 11 | 1010 |
| Select Tu A | 1 | 11 | 0001 |
| Select Tu B | 1 | 11 | 0010 |
| Select Tu C | 0 | 11 | 0011 |
| Select Tu D | 1 | 11 | 0100 |
| Select Tu E | 0 | 11 | 0101 |
| Select Tu F | 0 | 11 | 0110 |
| Select Tu G | 1 | 11 | 0111 |
| Select Tu H | 1 | 11 | 1000 |
| Select Tu I | 0 | 11 | 1001 |
| Select Tu J | 0 | 10 | 0001 |
| Set Read | 0 | 10 | 0010 |
| Set Write | 1 | 10 | 0011 |
| Read | 0 | 10 | 0100 |
| Write | 1 | 10 | 0101 |
| Backward | 1 | 10 | 0110 |
| Minus Zero | 1 | 10 | 1010 |
| Record Mark | 1 | 01 | 1010 |
| Group Mark | 0 | 11 | 1111 |
| Tape Mark | 0 | 00 | 1111 |
| Rewind | 0 | 10 | 0111 |
| Halt | 0 | 10 | 1000 |
| Leader | 1 | 10 | 1001 |

The data is made up of alphabetic and numeric characters all having odd parity. The instructions are made up of a number of tape unit control instructions and of special characters all having even parity, (the special characters being treated as instructions though they really are data). The full information carrying ability of a seven bit system is not utilized, room being left for expansion.

Figure 1:
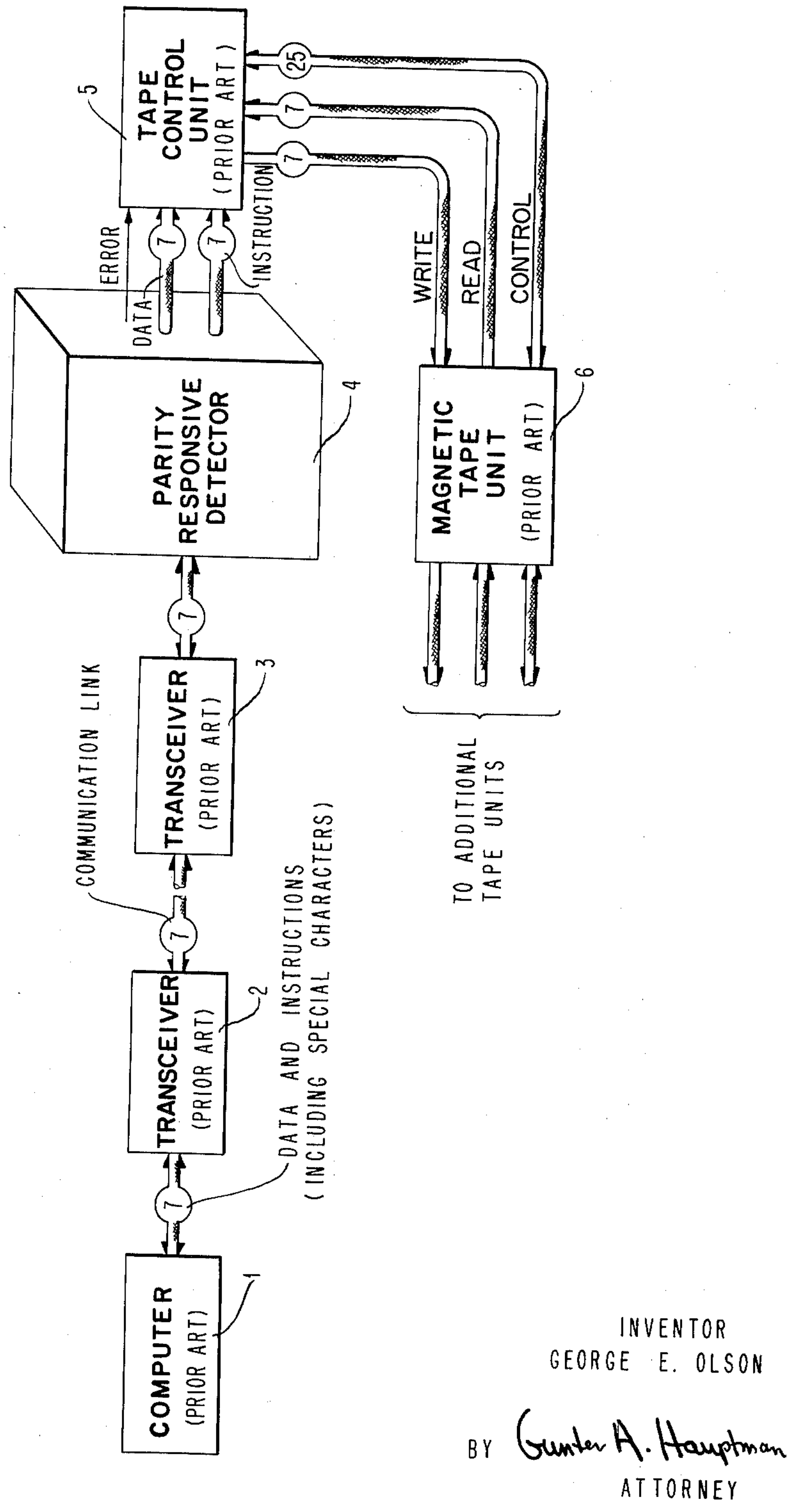

Referring now to FIGURE 1, there is shown a block diagram of a system utilizing the invention. Computer 1 is linked to a magnetic tape unit 6 by means of a seven channel telephone link connected between transceiver 2 and transceiver 3. Data and instructions are carried on seven channels between the computer 1 and the transceiver 2. The same data and instructions are carried between the transceiver 2 and the transceiver 3 by means of a seven channel transmission link. The data and instructions are carried between the transceiver 3 and the parity responsive detector 4, which is the subject of this invention, by means of another seven channel link. The parity responsive detector transmits instructions to a standard tape control unit 5 on a seven channel bus, data on another seven channel bus, and error signals on a single line. An additional "special character" line (not shown) will be explained with the reference to the third embodiment of the invention. Tape control unit 5 communicates with a standard magnetic tape unit by means of a seven channel "read" cable, a seven channel "write" cable, and a twenty-five channel "control" cable. Additional tape units may be connected in parallel with the magnetic tape unit 6 under the control of the tape control unit 5.

Still referring to FIGURE 1, it should be noted that data may be carried in either direction by the system. Instructions are normally transmitted only from the computer 1 to the magnetic tape unit 6, though certain "echo" signals may be transmitted from the magnetic tape unit 6 to the computer 1. For the purpose of simplicity, the embodiments of the invention described in this application will show the transmission of data and instructions in the direction from the computer 1 to the magnetic tape unit 6 only. However, it will be obvious that the invention may be extended to include transmission in the opposite direction.

The parity responsive detector 4 examines the parity of the signals present on the seven channel input bus and transfers these to the seven channel data output bus, if the parity is odd. If the parity is even the signals on the seven channel input bus are transferred to the seven channel instruction (and special character) output bus.

FIRST EMBODIMENT

Figure 2A:
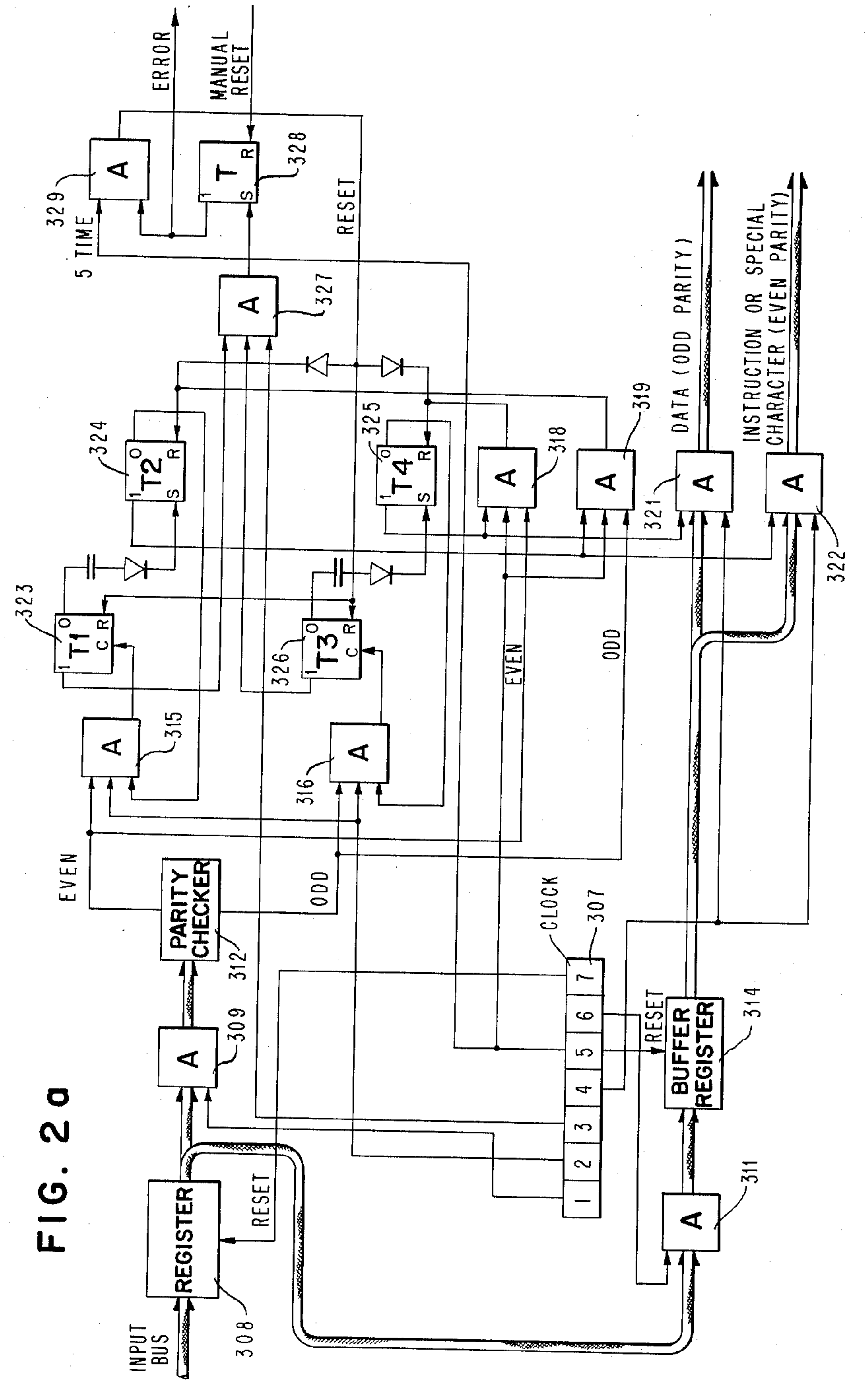

Referring now to FIGURE 2*a*, there is shown a first embodiment of the invention. Seven bit BCD characters present on the input fees representative of data or instructions (including special characters) are gated to one or the other of the output buses labeled "data" and "instruction or special character" by the invention. If the information on the input bus has an odd parity, then the information is routed to the outgoing "data" bus. If the information on the input bus has an even parity, then it is routed to the outgoing "instruction or special character" bus. If a single even parity character occurs in a block of odd parity information, the "error" output line will be operated. It will also be operated if a single odd parity character appears in a block of even parity information. Therefore, there will be an error indication whenever a single character of one parity appears in the middle of a block of at least two other characters having an opposite parity. In such cases it is assumed that the single character which does not conform to either of its neighbors is in error. As a result, single characters of information alone may not be transmitted. If this is done, an error indication will occur even though the single character is correctly transmitted. If it is desired to transmit single characters of information, for instance a single instruction in a block of data, then it will be necessary to utilize an additional "dummy" character adjacent to the single one transmitted.

Still referring to FIGURE 2*a*, the clock 307 is a standard ring counter, recycled at the end of seven counts, used to coordinate the operation of the parity responsive detector. The clock 307 is recycled after the count "7" is reached. Another scheme would be to restart the clock each time information is received by the register 308 to be described.

The register 308 receives information from the input bus on seven channels and transmits it to the parity checker 312 and the buffer register 314 on seven outgoing channels. The AND gates 309 and 311 gate information from the register 308 to the parity checker 312 and to the buffer register 314 at times 1 and 6 respectively. The parity checker 312 indicates on a line labeled EVEN that the parity of the incoming information is even (in this example, either an instruction or special character); or, on the line labeled ODD, that the information is odd (indicating that the information is numerical or alphabetic data).

The trigger $T_1$ 323 is a standard bistable trigger having a reset input R for bringing the "0" output up and a complement input "C" used for reversing state of the trigger. The trigger $T_1$ 323 is complemented by the output of the AND circuit 315 at 2-time of the clock 307 when: (a) the parity checker 312 indicates that the character in the register 308 has even parity, and (b) the trigger $T_2$ 324 is set to its "0" state. Similarly, the trigger $T_3$ 326 is complemented at 2-time by an output from the AND circuit 316 when: (a) the parity checker output line ODD indicates the character stored in the register 308 has an odd parity and (b) the trigger $T_4$ 325 is set to the "0" state. Whenever the trigger $T_4$ 323 is set to the "0" state, the positively rising signal applied to the set inputs of the trigger $T_2$ 324 causes the latter to be set to the "1" state. Similarly, the trigger $T_3$ 326 sets the trigger $T_4$ 325 to the "1" state whenever $T_3$ 326 is set to the "0" state. Triggers $T_2$ 324 and $T_4$ 325 are operative to permit operation of respective ones of the AND circuits 315 and 316 whenever they are in the "0" state. And, they are operative when in the "1" state, to permit operation of respective ones of AND circuits 318 and 319.

The output of AND circuit 318 operates at 5-time to reset the trigger 325 to the "0" state when: (a) the parity checker 312 indicates an even parity and (b) the trigger $T_4$ 325 is in the "1" state. Similarly, the AND circuit 319 operates at 5-time to reset the trigger $T_2$ 324 when: (a) $T_2$ is in the "1" state and (b) the parity checker 312 indicates an odd parity.

The AND gate 32 transfers the character stored in the buffer register 314 to the outgoing "data" bus at 4-time of the clock 307 if the trigger $T_4$ 325 is set to the "1" state. Similarly, if trigger $T_2$ 324 is set to the "1" state at 4-time of the clock 307, the AND circuit 322 transfers the character stored in the buffer register 314 to the outgoing "instruction or special character" bus.

If both triggers $T_1$ 323 and $T_3$ 326 are set to the "1" state at 3-time, the AND circuit 327 output causes the trigger 328 to be set to the "1" state, bringing up the "error" output line. AND circuit 329 is activated whenever an error is indicated to reset triggers $T_1$ 323, $T_2$ 324, $T_3$ 326 and $T_4$ 325 at 5-time of the clock 307.

The clock 307 is cycled once for each character entering the register 308. During 1-time of the clock 307 the AND circuit 309 is sampled, gating the contents of the register 308 into the parity checker 312, bringing up either the EVEN or ODD output line, depending upon the parity of the character contained in the register 308. At 2-time the AND circuits 315 and 316 are sampled, causing trigger $T_1$ 323 to be complemented if the parity of the character is even, or causing trigger $T_3$ 326 to be complemented if the parity is odd. At 3-time an error test is conducted, the AND circuit 327 having no output if both triggers $T_1$ 323 and $T_3$ 326 are set to the "1" state. The situation occurs only if first and second adjacent characters are of different parities and a third following character has the same parity as the first character. At 4-time the AND gates 321 and 322 are sampled to gate the character stored in the buffer register 314 to the proper outgoing bus, depending upon the setting of the triggers $T_2$ 324 and $T_4$ 325. At 5-time the buffer register 314 is reset, and if there was an error condition, all the triggers are reset. The AND circuits 318 and 319 are sampled to reset triggers $T_2$ 324 and $T_4$ 325 even if there was no error. At 6-time the contents of the register 308 are transferred to the buffer register 314 from where they will be removed during the next cycle of operation of the clock 307. At 7-time the register 308 is reset and a new character is entered from the input bus.

Figure 2B:
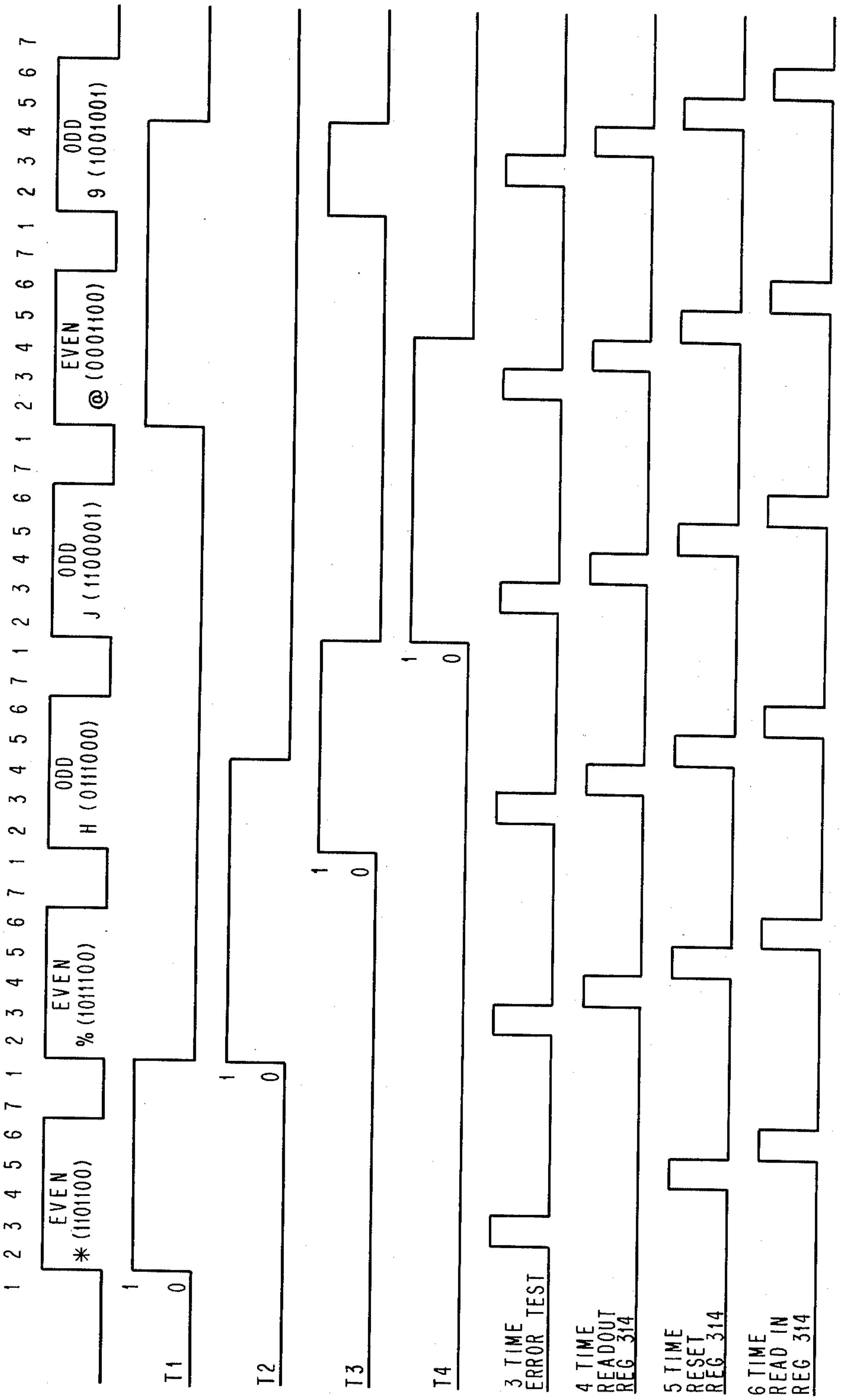

Operation of the first embodiment of the invention shown in FIGURE 2*a* will now be explained with reference to the waveforms shown in 2*b*. As shown in FIGURE 2*b*, it is assumed that information appears at the input bus to register 308 in the following order:

(1) Special character: * (1101100)
(2) Special character: % (1011100)
(3) Alphabetic character: H (0111000)
(4) Alphabetic character: J (1100001)
(5) Special character: @ (0001100)
(6) Numerical character: 9 (1001001)

It will be noted that an even information character (@) appears between two odd characters (J and 9). This is an error condition. Therefore, though it appears that the fifth character entering the register 308 is the special character @, this character should really have been an odd parity numerical or alphabetic character.

Initially all the triggers are set to the "0" state. During the first cycle of operation the first character (*) is entered into the register 308. At 1-time the even output of the parity checker 312 comes up, and at 2-time the trigger $T_1$ 323 is set to the "1" state. During times 3, 4 and 5 no changes occur. At 6-time of the clock 307 the character in the register 308 is transferred to the buffer register 314. At 7-time the register 308 is reset and the next character (%) is entered into the register 308.

During 1-time of the second cycle of operation the even output line of the parity checker 312 again comes up. At 2-time the trigger $T_1$ 323 is to the "0" state, bringing up its "0" output line which sets trigger $T_2$ 324 to the "1" state, dropping the "0" output line of the trigger $T_2$ 324 and blocking any further inputs to the AND circuit 315. Bringing up the "1" output for the trigger $T_2$ 324 enables the AND circuit 319 and the AND circuit 322. Since $T_3$ is still set to the "0" state, the AND circuit 327 is not operated at 3-time. At 4-time of this cycle the contents (*) of the buffer register 314 are transferred to the outgoing instruction or special character bus through the AND circuit 322. At 5-time the buffer register 314 is reset and at 6-time the contents (%) of the register 308 are entered into the buffer register 314. At 7-time the register 308 is reset and the next character (H) from the input bus line is entered into the register 308.

During 1-time of the third cycle of operation the ODD output line of the parity checker 312 will come up, causing the trigger $T_3$ 326 to be set to the "1" state at 2-time. At 3-time trigger $T_1$ is still set to the "0" preventing AND circuit 327 from operating trigger 328. At 4-time the contents of the buffer register 314 (%) are transferred to the "instruction or special character" outgoing bus since the trigger $T_2$ 324 is set to the "1" state. At 5-time the buffer register 314 will be reset as will be the trigger $T_2$ 324 (through AND circuit 319). At 6-time the character presently in the register 308 (H) will be transferred to the buffer register 314, a new character (J) entering the register 308 at 7-time.

During the fourth cycle of operation, the character (J) in the register 308 will be transferred to the parity checker 312, causing the ODD output line to come up. At 2-time the clock 307 causes the trigger $T_3$ 326 to be set back to the "0" state. When the trigger $T_3$ 326 is set to the "0" state, the trigger $T_4$ 325 is set to the "1" state. Since the output line "0" of the trigger $T_4$ 325 is down, any further inputs to the AND circuit 316 will be disabled. At 3-time AND circuit 327 is inoperative since $T_1$ and $T_3$ are both set to the "0" state. At 4-time the character (H) presently in the buffer register 314 is transferred to the outgoing "data" via the AND circuit 321, the "1" output line of the trigger $T_4$ 325 being up. At 5-time trigger $T_4$ is reset to the "0" state. At 6-time the character (J) is transferred from the register 308 to the buffer register 314. At 7-time the next character (@) is entered into the register 308.

During the fifth cycle of operation, the character (@) presently in the register 308 is transferred to the parity checker 312 at 1-time, bringing up the EVEN output line. At 2-time the "1" output line of trigger $T_1$ 323 comes up. $T_3$ remains set to "0" so that at 3-time there is no output from AND circuit 327. At 4-time the character (J) in the buffer register 314 is gated to the outgoing data bus via AND circuit 321 since the trigger $T_4$ 325 is in the "1" state at this time. At 5-time the trigger $T_4$ 325 is reset to the "0" state. At 6-time the character (@) in the register 308 is transferred to the buffer register 314, and at 7-time the next character (9) is entered into the register 308. During the sixth cycle of operation, at 1-time the ODD parity checker 312 comes up, causing the trigger $T_3$ 326 to be set to the "1" state.

It will be noted that for the first time both triggers $T_1$ 323 and $T_3$ 326 are set to the "1" state. This has occurred because there have been two consecutive parity transitions. At 3-time the trigger 328 is set to indicate that the character (@) in the buffer register 314 is in error. At 4-time this character (@) is not gated to either the outgoing data bus or the outgoing instruction or special character bus since neither of the triggers $T_2$ 324 or $T_4$ 325 are set to the "1" state at this time. The error signal will remain set until the manual reset of the trigger 328 is activated. At 5-time the buffer register 314 is reset destroying the character (@) stored therein and at this time the triggers $T_1$ through $T_4$ are reset. At 6-time the character (9) in the register 308 is transferred to the buffer register 314, and at 7-time the register 308 is reset and the next character is entered.

In summary, it has been shown how the first embodiment of the invention transfers information from its input bus to either an outgoing "data" bus or an outgoing "instruction or special character" bus in response to the parity of the information present on the input bus. Further, it has been shown that if an error condition occurs (a character having one parity surrounded by adjacent characters having the opposite parity) that the erroneous character is destroyed rather than being sent to an outgoing bus and then an error indication is emitted from the parity responsive detector.

SECOND EMBODIMENT

Figure 3:
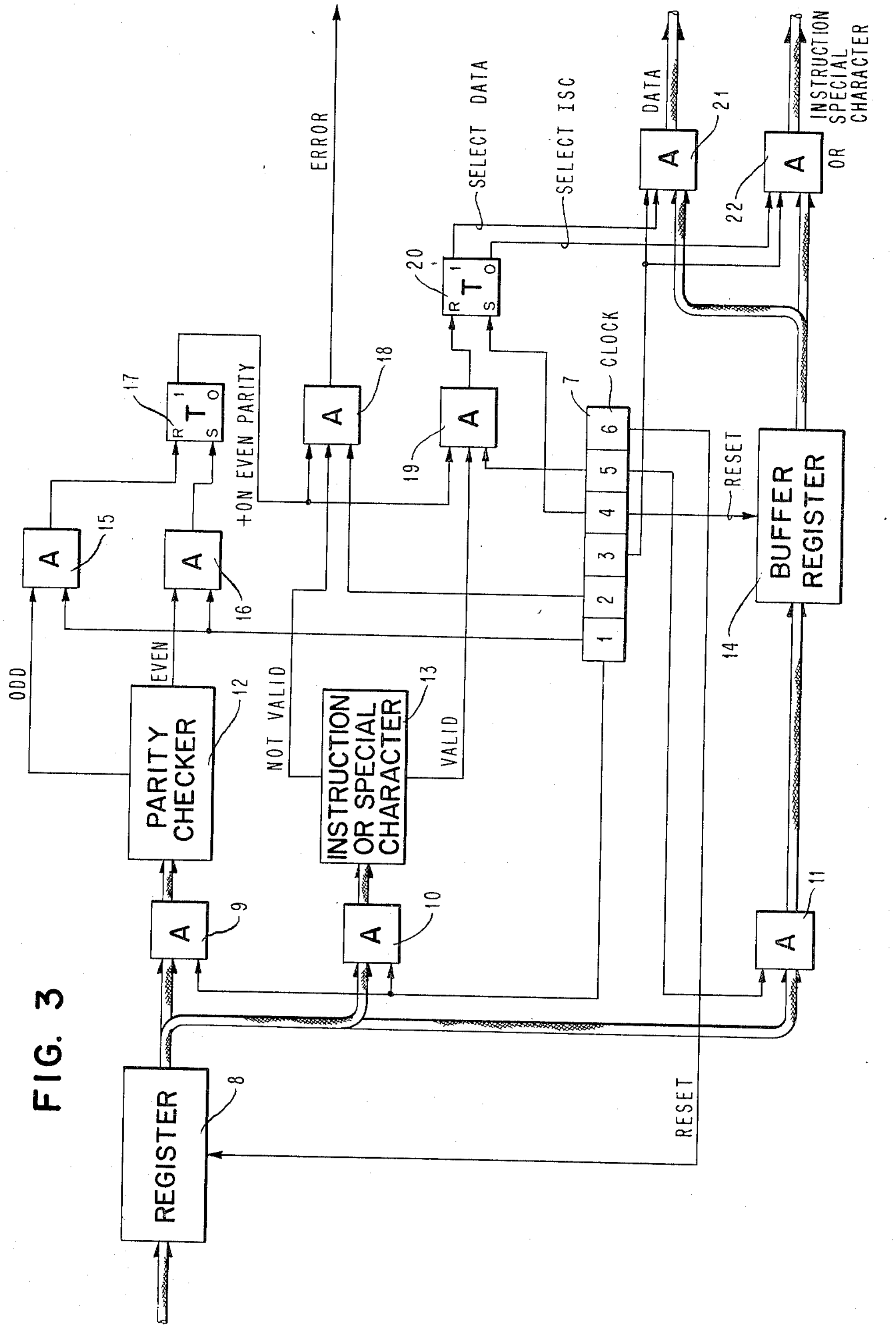
FIGURE 3 is a logic diagram of a second embodiment of the invention.

Referring now to FIGURE 3, a second embodiment of the invention is shown. In this embodiment it is possible to separate characters having opposite parities, and to alternate EVEN parity information (instructions or special characters) and ODD parity characters (alphabetic or numeric data). An error condition will occur if: (a) the information has an even parity (indicating that it should be an instruction or special character) and (b) the information is not an instruction or special character.

Errors are indicated on the "error" output line. All seven channel paths are shown by cables whereas control lines are shown by single lines.

The clock 7 provides signals to control the operations described below, and is initiated by placing data into register 8. Register 8 transfers a seven bit character from the input bus to the parity checker 12 at each 1-time. The parity checker 12 is a standard circuit for determining whether the number of bits present on a seven channel input line are odd or even. If the number of bits is odd, the "odd" line comes up, and if the number of input bits is even the "even" line comes up. The instruction or special character recognition means 13 is a standard decoder, designed by well-known methods, for determining whether a seven bit word is or is not an instruction or special character. If data present at the input of the instruction or special character checker 13 is a valid instruction or special character, as shown in the above Table, the line labeled "valid" comes up. If the word present at the input is not a valid instruction or special character, then then line labeled "not valid" comes up. The trigger 17 stores the parity of the last character as indicated by the parity checker 12. The line labeled "+ on even parity" comes up if an even parity was indicated last. If the parity was odd, the line is down. The trigger 20 indicates whether the data bus or "instruction or special character" output bus is to be selected. If input characters are to be transmitted to the "data" bus the trigger 20 output line "select data" comes up; otherwise, the output line "select ISC" indicates that the word is to be transmitted on the "instruction or special character" bus. Register 14 is used as a buffer to store single characters before it is decided whether they are to be transmitted on the "data" or "instruction or special character" output bus.

The AND circuit 9 is operated at 1-time to transfer an input character from the register 8 to the parity checker 12. The AND circuit 10 is operated at 1-time to transfer the same character from the register 8 to the instruction or special character checker 13. The AND circuit 11 is operated at 5-time to transfer an input word from the register 8 to the buffer register 14. The AND circuit 15 is operated at 1-time to set the trigger 17 to indicate an odd parity, the AND circuit 16 being used to set the trigger 17 to indicate an even parity. The AND circuit 18 is operated at 2-time to indicate an error signal on the output line labeled "error" if all of its inputs are up.

Therefore, an error will be indicated at 2-time if: (a) the trigger 17 was set (by the last character) to indicate an even parity, and (b) the present word is not a valid instruction or special character.

The AND circuit 19 operates the trigger 20 at 5-time to select the instruction or special character bus for the transmission of information from the buffer register 14, by bringing up the line "select ISC." The output line "select ISC" of the trigger 20 is operated by the AND circuit 19 only if the trigger 17 indicates an even parity and the instruction or special character checker 13 indicates a valid instruction or special character. Otherwise the trigger 20 is not set by the AND circuit 19 keeping a signal on line "select data," the trigger 20 having been set to this state initially at 4-time. The AND circuit 21 gates information at 3-time from the buffer register 14 to the output "data" bus, the AND circuit 22 gating information from the buffer register 14 to the "instruction or special character" bus, depending upon the setting of trigger 20.

Data information will be entered into the register 8 during five cycles in the following order:

Numerical character: 9 (1001001)
Alphabetic character: X (1010111)
Instruction character: "Select Tape Unit A" (1110001)
Special character: □ (0111100)
Numerical character: 2 (0000010)

During cycle 1 of operation, the first character (9) enters register 8 and starts the clock 7. At 1-time AND circuit 9, AND circuit 10, AND circuit 15, and AND circuit 16 are enabled. The enabling of AND circuit 9 causes the transfer of the contents of the register 8 to the parity checker 12. The enabling of AND circuit 10 causes the transfer of the contents of register 8 to the instruction or special character checker 13. Since the sum of the 1-bits of the character (9) in the register 8 is odd, the output line "ODD" of the parity checker 12 comes up. Also, since the data word transferred from the register 8 to the instruction or special character checker 13 is not a valid instruction or special character (it being a numerical character) the output line "not valid" comes up. The trigger 17 is set by the output of the AND circuit 15 causing the output line "+ on even parity" to be down. At 2-time the AND circuit 18 is tested to determine whether there is an error. The "not valid" input line is up but the input line "+ on even parity" is down so that the "error" output line does not come up, indicating that there is no error.

This particular embodiment of the invention does not check whether a particular data, instruction or special character word is correct, only checking whether an even parity character is actually an instruction or special character.

At 3-time the AND circuits 21 and 22 are enabled to transfer the contents of the buffer register 14 to the "data" output bus or to the "instruction or special character" output bus, depending upon the setting of the trigger 20. However, since it is assumed there was no information entered into the buffer register 14 previously, no information will be transferred to the buffers at this time. At 4-time, the buffer register 14 is reset. At 5-time the AND circuit 11 and the AND circuit 19 are enabled, causing the contents (9) of the register 8 to be transferred to the buffer register 14, and the trigger 20 to be reset bringing up the output line "select data." At 6-time the register 8 is reset.

At the start of the second cycle of operation the next character (X) is entered into the register 8. At 1-time this information (X) is transferred from the register 8 to the parity checker 12 and to the instruction or special character checker 13. The trigger 17 is again set so that the "+ on even parity" line is down; the alphabetic character X having an odd parity. At 2-time the AND circuit 18 is sampled to determine whether there is an error. The line "not valid" is up, (the alphabetic character X not being a valid instruction or special character), but the line "+ on even parity" is down so that no error will be indicated. At 3-time the AND circuits 21 and 22 are sampled. Since the trigger 20 output line "select data" is up from the last cycle of operation, the AND circuit 21 will be operated to cause a character (9) to be transferred from the buffer register 14 to the output data bus. At 4-time the buffer register 14 is reset and the trigger 20 is reset, in this case keeping the "select data" output line up. At 5-time the contents (X) of the register 8 are transferred to the buffer register 14 and the AND circuit 19 is ampled. Since no other inputs of the AND circuit 19 are up, the trigger 20 remains set ("select data") as previously mentioned. At 6-time the register 8 is reset.

During the third cycle of operation another character ("select to A") is entered into the register 8. At 1-time this instruction word is transferred from the register 8 to the parity checker 12 and into the instruction or special character checker 13. Since there are an even number of 1-bits in this instruction character, the output line "even" of the parity checker 12 comes up. (This causes the trigger 17 to be set to bring up the "+ on even parity" output line.) Further, since this is a valid instruction, the output line "valid" of the instruction or special character checker 13 comes up. At 2-time the AND circuit 18 is tested to determine whether there has been an error. Since, as previously mentioned, the "not valid" line is not up, the "error" output line of the AND circuit 18 cannot come up even though the "+ on even parity" line is up. At 3-time the character ("X") stored in the buffer register 14 is transferred to the "data" bus by the AND circuit 21, the trigger 20 output line "select data" still being up from the last cycle of operation. At 4-time the buffer register 14 is reset, and the trigger 20 is reset, again retaining its previous state. At 5-time the contents ("select to A") of the register 8 are transferred to the buffer register 14, and the trigger 20 is set to bring up the output line "select ISC," all three inputs of the AND circuit 19 being up. At 6-time the register 8 is reset.

During the fourth cycle of operation another character (□) is entered into the register 8. At 1-time this special character is transferred from the register 8 to the parity checker 12 and to the instruction or special character checker 13, causing the lines "even" and "valid" respectively to come up. As a result the trigger 17 output line "+ on even parity" comes up. At 2-time the AND circuit 18 is sampled, but since the input line "not valid" is not up no error is indicated. At 3-time the information ("select to A") stored in the buffer register 14 is transferred to the instruction or special character bus via the AND circuit 22 since the trigger 20 output line "select ISC" is up from the previous cycle. At 4-time the buffer register 14 is reset and the trigger 20 is reset to bring up the "select data" output line. At 5-time the character (□) in the register 8 is transferred to the buffer register 14 and the AND circuit 19 is sampled, causing the trigger 20 output line "select ISC" to come up, since all three inputs of the AND circuit 19 are up. At 6-time the register 8 is reset.

During the fifth cycle of operation another character (2) enters the register 8. At 1-time this data is transferred to the parity checker 12 and to the instruction or special character checker 13 resulting in the setting of the trigger 17 to cause the "+ on even parity" output line to fall, and also causing the instruction or special character checker 13 output line "not valid" to come up. At 2-time the AND circuit 18 is sampled. There will be no error indicator since the "+ on even parity" line is down. At 3-time the contents (□) of the buffer register 14 are transferred to the "instruction or special character" bus via the AND circuit 22 since the trigger 20 output line "select ISC" is up from the last cycle. At 4-time the buffer register 14 is reset and the trigger 20 is reset to bring up the "select data" output line. At 5-time the character (2) stored in the register is transferred to the buffer register 14, and the AND circuit 19 is sampled, the trigger 20 remaining set as previously described. At 6-time the register 8 is reset. The data (2) stored in the buffer register 14 will be transferred to the "data" output bus during 3-time of the next cycle.

THIRD EMBODIMENT

Figure 4:
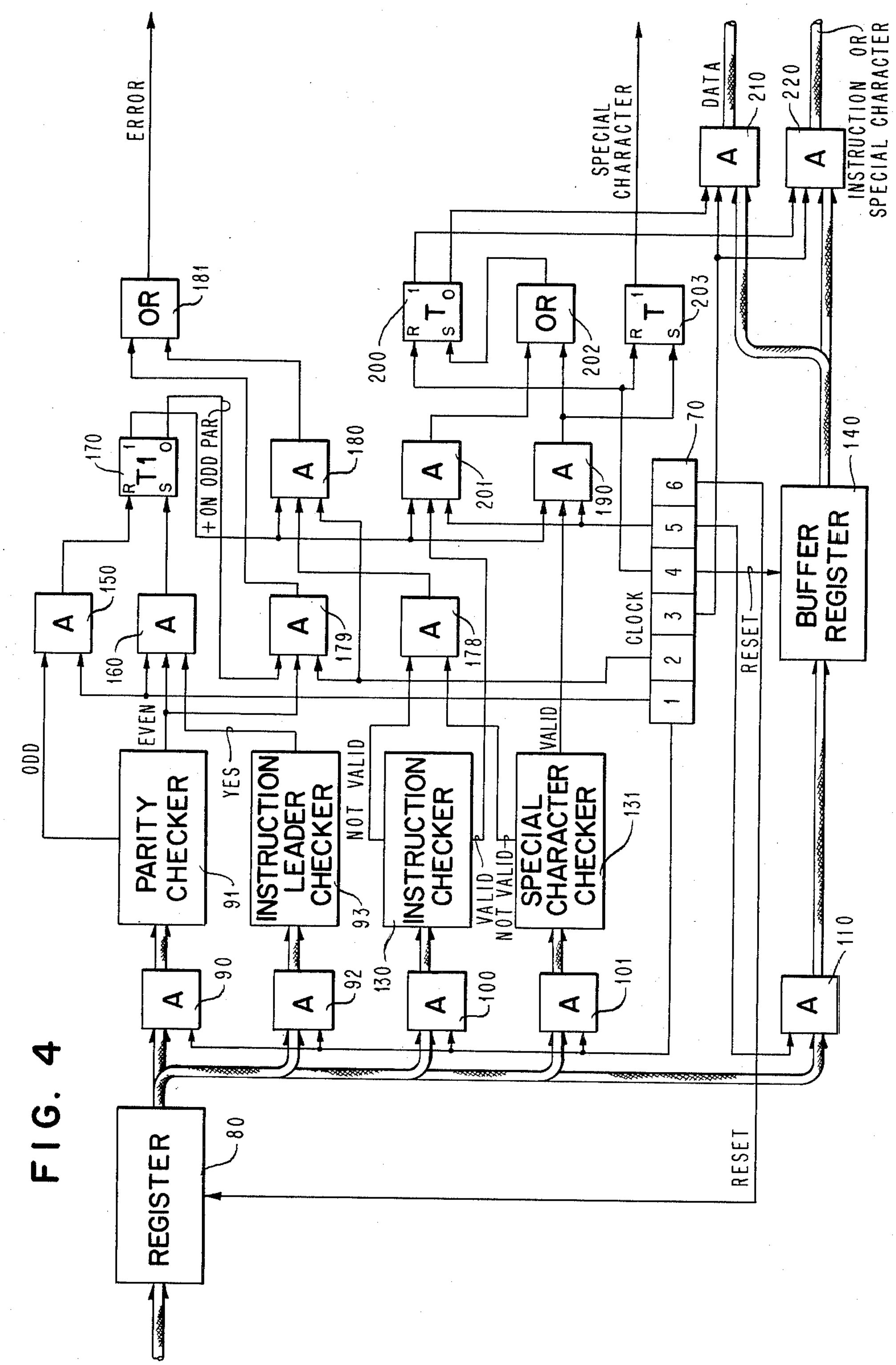
FIGURE 4 is a logic diagram of a third embodiment of the invention.

Referring now to FIGURE 4, there is shown another embodiment of the invention. This version permits the separate identification of (alphabetic and numerical) characters, instruction characters and special characters. In order to achieve this, it is specified that a character called an "instruction leader" (which is merely a non-functional character "fill") precede each group of instruction and special characters. It is obvious that the use of a "leader" in association with instructions instead of other characters is a matter of choice. A further feature of the embodiment of the invention shown in FIGURE 4 is that a special character may be distinguished from an instruction character on the "instruction or special character" bus by means of an additional line called the "special character" line which comes up when the information on the "instruction or special character" bus is a special character. This line is down at all other times.

The register 80 is used to store information from the transceiver 3 shown in FIGURE 1. The parity checker 91 is a standard device for determining whether the sum of the 1-bit of input signals is odd or even. If the sum is odd, the output line "ODD" comes up, and if the sum is even, the output line "EVEN" comes up. The instruction leader checker 93 is a standard decoder for determining whether the code present at its input is or is not one the code allotted to an instruction "leader." If the code is valid, the output line "yes" comes up, if not, the "no" line comes up. The instruction checker 130 is another standard decoder for determining whether the input code is or is not one of those codes allotted to instructions, characters, including "leaders." If it is, the output line "VALID" comes up; if it is not, the output line "NOT VALID" comes up. The special character checker 131 is still another standard decoder for determining whether the input code corresponds to one of those codes assigned to special characters. If it does, the output line "VALID" comes up; if it does not, the output line "NOT VALID" comes up. The buffer register 140 stores characters prior to transmission to one of the two output bases. The clock 70 is a standard clock for controlling the transfer of information among the other parts of the invention by supplying signals to gates in a predetermined sequence.

The trigger 170 is a standard trigger used to store whether a particular character has odd parity or is an even parity instruction leader. Trigger 170 output "1" is operated only by a character that has: (a) even parity and (b) is an instruction "leader." One trigger 170 is set to "1," it remains set until reset by an odd parity character. The trigger 200 is a standard trigger used to store whether a particular character is either a data character or an instruction or special character. The trigger 203 is another standard trigger used to indicate whether a particular character is or is not a special character.

The AND circuit 90 is used at 1-time to transfer information from the register 80 to the parity checker 91. The AND circuit 92 is used at 1-time to transfer information from the register 80 to the instruction leader checker 93. The AND circuit 100 is used at 1-time to transfer information from the register 80 to the instruction leader checker 93. The AND circuit 100 is used at 1-time to transfer information from the register 80 to the instruction checker 130. The AND circuit 101 is used at 1-time to transfer information from the register 80 to the special character checker 131. The AND circuit 110 is used at 5-time to transfer information from the register 80 to the buffer register 140. The AND circuit 150 is used at 1-time to set the trigger 170 to indicate that there is an odd parity character in the register 80. The AND circuit 160 is used at 1-time to set the trigger 170 to indicate that there is a character having even parity in the register 80. The AND circuit 179 is used at 2-time to indicate that the present character has an even parity, whereas the previous character (2) was not an even parity instruction "leader." This is an error condition. The AND circuit 178 is used to determine the condition wherein a word in register 80 is not a valid instruction character and also not a valid special character. The AND circuit 180 is used at 2-time to indicate, in conjunction with AND circuit 178, an error if there is an even parity character in an even parity group following which there is not a valid instruction or special character.

The OR circuit 181 indicates errors by signals on the "error" line.

An error occurs in this embodiment in two cases: (1) An odd parity character is followed by an even parity character that is not an even parity instruction "leader" (the trigger $T_1$ 170 will be set to "0" permitting an output from AND circuit 179, and (2) an even parity character which is not a "leader" instruction or special character occurs in a group following a "leader" (the trigger $T_1$ 170 will be set to "1" by the "leader" and remain so set, enabling AND circuit 180). It is an error to violate the rules that a "leader" must precede all instructions and special characters and that a "leader" must always be followed by an instruction or special character.

The AND circuit 201 is used at 5-time to indicate that a valid instruction character, which was preceded by a "leader" having an even parity is present in the register 80. The AND circuit 190 is used to indicate at 5-time that a valid special character (which was preceded by an even parity "leader") is present in the register 80. The OR circuit 202 is used to set the trigger 200 to indicate the character in the register 80, after transfer to the buffer register.

During the first cycle of operation the first character (9) enters the register 80. During 1-time the character (9) is transferred to the parity checker 91, the instruction leader checker 93, the instruction checker 130, and the special character checker 131 via the AND circuits 90, 92, 100 and 101. Because the character in the register 80 has an odd parity, the "odd" output line at the parity checker 91 comes up. As a result both inputs of the AND circuit 150 are up, causing the "0" output of the trigger $T_1$ 170 to come up. The character (9) in the register 80 is not an instruction leader, an instruction or a special character, so that the output line "yes" of the instruction leader checker 93 will be down and the "not valid" lines of the instruction checker 130 and the special character checker 131 will be up. At 2-time the AND circuits 179 and 180 will be enabled to test for an error condition. The "even" input to the AND circuit 179 is down so that there will be no output from that AND circuit. The upper input of the AND circuit 180 is down due to the setting of the trigger $T_1$ 170 so that there will be no output from that AND circuit. Since there are no inputs to the OR circuit 181 there will be no "error" signal at this time. At 3-time the AND gates 210 and 220 are enabled to transfer the contents of the buffer register 140 to one of the output buses. However, it is assumed that the buffer register 140 is empty at the start of operation so that no character will be transferred at this time. At 4-time the buffer register 140 is reset and the triggers 200 and 203 are reset to bring down their "1" outputs. Thus, the "special character" line is down, and the "0" output of the trigger 200 running to the AND circuit 210 is up at this time. At 5-time the AND circuit 110 is enabled, transferring signals representative of the contents (9) of the register 80 to the buffer register 140. At this time also the AND circuits to 201 and 190 are enabled. However, since the character (9) in the register 80 is not a valid instruction or special character there will be no outputs from AND circuits 201 and 190. As a result, the "0" output of trigger 200 running at the AND block 210 remains up, enabling that circuit for the transfer of information from the buffer register 140 to the "data" bus during the 3-time of the next cycle of operation. The "special character" output of the trigger 203 remains down. At 6-time the register 80 is reset, destroying the character (9) already transferred to the buffer register 140.

During the second cycle of operation another character (3) enters the register 80. At 1-time the "odd" output line of the parity checker 91 comes up. As a result, the "0" output of the trigger $T_1$ 170 remains up. The "not valid" output lines of both the instruction checker 130 and the special character checker 131 come up. During 2-time the AND circuits 179 and 180 are enabled to check for an error condition. Since the inputs to these AND circuits and to the AND circuit 178 are the same as during the first cycle of operation, there will be no error indication. At 3-time the AND circuits 210 and 220 are enabled. Since the AND circuit 210 has all of its control inputs up (the "0" output of trigger 200 was brought up during the last cycle), the contents (9) of the buffer register 140 are transferred to the "data" bus. During 4-time the buffer register 140 is reset and the triggers 200 and 203 are reset as previously described. At 5-time signals representative of the contents (3) of the register 80 are transferred to the buffer register 140. At this time also the AND circuits 201 and 190 are enabled, but as previously described have no effect on the triggers 200 and 203 because the character (3) in the register 80 is not a valid instruction or special character. At 6-time the register 80 is reset.

During the third cycle of operation the next character ("leader") will be put into the register 80. During 1-time the "even" output of the parity checker 91 comes up as does the "yes" output of the instruction leader checker 93. As a result all of the inputs of the AND circuit 160 are present causing the trigger $T_1$ 170 to be set at a state which brings up the "1" output line. The "valid" output line of the instruction checker 130 is up since a leader is treated as a valid instruction, and the special character checker 131 "not valid" line is up. Note that since the instruction leader is treated as an instruction, it will be transferred outward on the "instruction or special character" bus during the next 3-time. Because the instruction leader serves no functional purpose it could also be treated as a special character by having the special character checker 131 recognize the instruction leader as a valid special character.

At 2-time an error check is conducted of the AND circuits 179 and 180. Since the lower output of the trigger $T_1$ 170 is down, there will be no output from the AND circuit 179, and since the instruction leader is interpreted as a valid instruction by the instruction checker 131 there will be no output from the AND circuit 178, thus blocking the AND circuit 180. At 3-time the contents (3) of the buffer register 140 are transferred to the "data" bus, the "0" output of the trigger 200 still being up. At 4-time the buffer register 140 is reset and the triggers 200 and 203 are reset as previously described. At 5-time signals representative of the contents ("leader") of the register 80 are transferred to the buffer register 140. At this time also the AND circuits 201 and 190 are enabled. Since all of the inputs to the AND circuit 201 are present, the trigger 200 will be set, bringing up its "1" output line running to the AND gate 220. At 6-time the register 80 is reset.

During the fourth cycle of operation the next character (the instruction: "Read") is entered into the register 80. At 1-time the "even" output line of the parity checker 91 comes up. The "yes" output line of the instruction leader figure 93 is down at this time, so that the trigger $T_1$ 170 remains set with its "1" output up as previously described. The "valid" output of the instruction checker 130 is up since the character "Read" in the register 80 is a valid instruction. The "not valid" output line of the special character checker 131 comes up. At 2-time the AND circuits 179 and 180 are enabled, there however being no outputs from these AND circuits because there is no input to the AND circuit 179 from the trigger $T_1$ 170 and there is no middle input to the AND circuit 180. At 3-time the contents ("leader") of the buffer register 140 are transferred to the "instruction or special character" bus via the AND circuit 220, (the "1" output of the trigger 200 being up from the previous cycle of operation). At 4-time the buffer register 140 and the triggers 200 and 203 are reset so that the AND circuit 210 is now enabled. At 5-time the contents ("Read") of the register 80 are transferred to the buffer register 140. At this time also there is an output from AND circuit 201, causing the trigger 200 "1" output to be re-enabled, re-enabling AND circuit 220. At 6-time the register 80 is reset.

During the fifth cycle of operation the next character (%) is entered into the register 80. At 1-time it causes the "even" output of the parity checker 91, and the "not valid" outputs of the instruction checker 130 and special character checker 131 to come up. The trigger $T_1$ 170 remains set as previously described with its "1" output up. At 2-time the usual error check is conducted, there being no error indication for the same reasons as previously described. At 3-time the contents ("Read") of the buffer register 140 are transferred to the "instruction or special character" bus via the AND gate 220 because the trigger 200 "1" output is up from the previous cycle of operations. At 4-time the buffer register 140 and the triggers 200 and 203 are set, by an output from the AND circuit 190, to a state which brings up their "1" output lines. At 6-time the register 80 is reset.

Note that the "special character" line is now up. This indicates that the next character to be transferred outward on the "instruction or special character" bus (during the next cycle of operation at 3-time) will represent a special character.

During the sixth cycle of operation an obliterated character (which appears to be an "I," but which originally was the special character ",") is entered into the register 80. The special character "," is represented by the binary quantity: 1111011. Due to an error in transmission a 1-bit was dropped, giving the quantity: 1111001. The rule that a "leader" must precede each group of instructions and special characters was not initially violated, but due to a transmission error, a violation of this rule will be simulated, causing an error signal to be generated.

At 1-time the "odd" output line of the parity checker 91 comes up. The "not valid" output lines of the instruction checker 130 and the special character checker 131 come up. As a result the trigger $T_1$ 170 is reset to bring up the output line "+ On Odd Par." At 2-time an error check is conducted. No error is indicated at this time because the middle input of the AND circuit 179 and the top input of the AND circuit 180 are not present. At 3-time the character (%) in the buffer register 140 is transferred to the "instruction or special character" output bus via the AND circuit 220, the trigger 200 having been set to the "1" state in the previous cycle of operation.

Note that the "special character" output line has a signal applied to it at this time, the trigger 203 having been set to the "1" state in the previous cycle of operation.

At 4-time the buffer register 140 is reset and the triggers 200 and 203 are reset to the "0" state. At 5-time signals representative of the obliterated character ("I") are transferred from the register 80 to the buffer register 140. At 5-time, also, the AND circuits 201 and 190 are enabled, but no output results because the middle inputs are not present, the triggers 200 and 203 remaining reset to the "0" state. At 6-time the register 80 is reset.

During the seventh cycle of operation the next character (the instruction: "write") is entered into the register 80.

Note that if this character was the first instruction or special character in a block, it should have been preceded by a "leader." This is what it appears to be since it follows an alphabetic ("I"). Actually, the previous character was not an alphabetic character at all, but was a special character (",").

At 1-time the "even" output line of the parity checker 91 comes up. At this time also the "valid" output line of the instruction checker 130 comes up as does the "not valid" of the output line special character 131. The trigger $T_1$ 170 remains as set during the previous cycle of operation (in the "0" state) since all of the inputs to the AND circuit 160 are not present. At 2-time an error check is made by enabling AND circuits 179 and 180. Since the parity checker 91 output line "even" is up and since the trigger $T_1$ 170 output line "+On Odd Par" is also up, there will be an output from AND circuit 179. As a result there will be an output from OR circuit 181 causing a signal to be transmitted on the "error" output line.

It is obvious that this signal could be used to block the transfer of the obliterated character contained in the buffer register 140, though for simplicity, this has not been shown.

At 3-time the character ("I") in the buffer register 140 is transferred to the "data" output bus, the trigger 200 having been set to the "0" state during the previous cycle. At 4-time the buffer register 140 is reset, as are the triggers 200 and 203. At 5-time signals representative of the character ("write") in the register 80 are transferred to the buffer register 140. At 5-time the AND circuits 201 and 190 are enabled. Since the trigger is set to the "0" state, there will be no outputs from these AND circuits. As a result, the triggers 200 and 203 will remain reset to the "0" state, causing the contents ("write") of the buffer register 140 to be transferred to the "wrong" ("data") output bus during the next cycle of operation, a "misdirection" that will continue for succeeding instruction or special characters, until "leader" occurs. The signal on the "error" output line alerts the operator to this condition. It is obvious that the circuit can be changed to transfer the contents of the buffer register 140 to the proper one of the output buses if it is so desired. At 6-time the register 80 is reset.

Three embodiments of apparatus responsive to a plurality of types of information, indicated by the parity of transmitted characters, have been described. The first embodiment indicates an error when first types of information are inter-mixed with other types of information. The second embodiment of the invention indicates an error when first types of information are indicated by the parity of a character, while a decoder recognizes that the information actually belongs to other types. In the third embodiment of the invention an error is indicated when one or more types of information follow other types of information without the intervention of a "leader." All three embodiments transfer input characters to one of a number of output buses according to the types of information carried by the input bus. In the third embodiment different types of information on a single output bus may be identified by the utilization of an extra line which carries a first signal when one type of information is on the bus, and a second signal when another type of information is on the bus. This technique is equally applicable to the first and second embodiment.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination: means for receiving groups of signals in succession, each of said groups representing a number of 1-bits and 0-bits; generating means connected to said receiving means for generating a first indication when the number of 1-bits in a received group is odd, and a second indication when the number of 1-bits in a received group is even; first utilization means; first means, connected between said generating means and said first utilization means, operable by said first indication to make said received groups having odd number of bits available to said first utilization means; second utilization means; and second means, connected between said generating means and said second utilization means, operable by said second indication to make said received groups, having even numbers of bits, available to said second utilization means.

2. The apparatus described in claim 1, including: transition means connected to said generating means for generating third indications when successive ones of said received signal groups, having different ones of said odd number and even number of 1-bits, cause a transition from one of said first and second indications to the other; means connected to said transition means, responsive to a number of said third indications for emitting an error signal when one of said successively received signal groups has one of said odd and even number of 1-bits and an adjacent preceding and an adjacent succeeding one of said signal groups both have the other one of said number of 1-bits.

3. Apparatus for controlling transfers of different types of information-representative signal groups, including: means for receiving groups of signals in succession, each of said groups comprising binary-coded bits having one of an odd parity correctly representative of a first type of information, and an even parity correctly representative of a second type of information; first means connected to said receiving means for generating a first indication when a received group has odd parity, and a second indication when a received group has even parity; first utilization means; first gating means connecting said receiving means and said first utilization means, operable by said first indication to make said received groups having odd parity available to said first utilization means; second utilization; and second gating means connecting said receiving means and said second utilization means, operable by said second indication to make said received groups having even parity available to said second utilization means.

4. The apparatus set forth in claim 3, including: second means connected to said receiving means for generating a third indication when the received group of signals are representative of said first type of information and a fourth indication when the received group of signals are representative of said second type of information; and means, connected to said first and second means, operable to emit an error signal in response to one of said first and second indications and one of said third and fourth indications, when a received group of signals has one of said odd parity and even parity and is representative of an incorrect one of said first and second types of information.

5. Data transfer apparatus, including: means for receiving, in succession, binary data words, selected ones of said words having a first parity representative of a first number of classes of information and selected others of said words having a second parity representative of a second and third number of classes of information; first means electrically connected to said receiving means for generating a first number of indications, representative of the parity of each received word; second means electrically connected to said receiving means for generating a second number of indications, identifying the class of information represented by said received word; first and second output means; first gating means electrically connected between said receiving means and said first output means operable in response to said first and second number of indications to transfer from said receiving means, to said first output means, in succession, said received data words representative of said first number of classes of information; and second gating means electrically connected between said receiving means and said second output means operable in response to said first and second number of indications to transfer, in succession, received data words representative of said second and third numbers of classes of information from said receiving means to said second output means.

6. Data transfer apparatus as set forth in claim 5, including:

means electrically connected to said second means and operable by said second number of indications to emit a number of signals indicating which of said second and third numbers of classes of information have been transferred to said second output means.

7. Data transfer apparatus as set forth in claim 6, including:

decoding means electrically connected to said receiving means for generating signals indicative of the presence and absence of a preselected word of a preselected one of said numbers of classes in said receiving means; and means electrically connected to said second means and to said decoding means, operable to emit an error signal in response to an absence-indicative signal, generated in accordance with a first successively received word, and to specified ones of said second number of class identifying indications, generated in accordance with a second successively received word, when a word identified as being in a specified number of said classes is not immediately preceded by said preselected word.

8. Apparatus for efficiently utilizing data transmission facilities, including:

a first register for storing, in turn, successive information representative signal groups currently received from the data transmission facility;

a checker connected to the first register, for generating an "odd" indication if the group currently stored in the first register has an odd number of signals, and an "even" indication if said group has an even number of signals;

a second register, for storing, in turn, coded signal groups;

transfer means, interconnecting the first and second register, operable after generation of an indication by the checker to transfer each signal group currently stored in the first register to the second register;

storage means connected to the checker for storing the generated indications;

directional routing means, connected to the storage means and to the second register, operable when an "odd" indication is stored to route the corresponding signal group currently stored in the second register in one direction, and operable when an "even" indication is stored to route the said signal group in another direction; and error signalling means connected to said storage means operable to generate an error signal as a function of information represented by successive signal groups, the information including the number of signals in each group.

References Cited by the Examiner

UNITED STATES PATENTS 2,884,487 4/59 Young ---------------- 178—23

MALCOLM A. MORRISON, *Primary Examiner.*

DARYL W. COOK, *Examiner.*